(12) United States Patent
Chen et al.

(10) Patent No.: US 11,136,491 B2
(45) Date of Patent: Oct. 5, 2021

(54) IRON SULFIDE REMOVAL IN OILFIELD APPLICATIONS

(71) Applicant: Saudi Arabian Oil Company, Dhahran (SA)

(72) Inventors: Tao Chen, Dhahran (SA); Qiwei Wang, Dhahran (SA); Fakuen Frank Chang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/990,329

(22) Filed: May 25, 2018

(65) Prior Publication Data
US 2018/0340113 A1    Nov. 29, 2018

Related U.S. Application Data

(60) Provisional application No. 62/511,765, filed on May 26, 2017.

(51) Int. Cl.
*C09K 8/532* (2006.01)
*C09K 8/528* (2006.01)
*C09K 8/54* (2006.01)

(52) U.S. Cl.
CPC .............. *C09K 8/532* (2013.01); *C09K 8/528* (2013.01); *C09K 8/54* (2013.01); *C09K 2208/20* (2013.01); *C09K 2208/32* (2013.01)

(58) Field of Classification Search
CPC ............ C09K 2208/20; C09K 2208/32; C09K 8/528; C09K 8/532; C09K 8/54
See application file for complete search history.

(56) References Cited

U.S. PATENT DOCUMENTS

| | | | |
|---|---|---|---|
| 2,357,559 | A | 9/1944 | Smith |
| 2,844,497 | A | 7/1958 | Henricks |
| 3,462,239 | A | 8/1969 | Swanson et al. |
| 3,629,104 | A | 12/1971 | Maddox |
| 3,959,170 | A | 5/1976 | Mago et al. |
| 4,100,099 | A | 7/1978 | Asperger et al. |
| 4,100,100 | A | 7/1978 | Clouse et al. |
| 4,158,548 | A | 6/1979 | Burk et al. |
| 4,276,185 | A | 6/1981 | Martin |
| 4,351,673 | A | 9/1982 | Lawson |
| 4,372,873 | A | 2/1983 | Nieh |

(Continued)

FOREIGN PATENT DOCUMENTS

| | | |
|---|---|---|
| CA | 1187064 | 5/1985 |
| CA | 2546164 | 3/2007 |

(Continued)

OTHER PUBLICATIONS

Gulf-Cooperation Council Examination Report issued in GCC Application No. GC 2018-35378 on Nov. 25, 2019, 4 pages.

(Continued)

*Primary Examiner* — Alicia Bland
(74) *Attorney, Agent, or Firm* — Fish & Richardson P.C.

(57) ABSTRACT

Dissolving iron sulfide on the carbon steel tubing to yield chelated iron is achieved by treating the carbon steel tubing with a composition including an iron chelant and an additive. The additive includes at least one of an oxidizing agent and a base. A weight ratio of the iron chelant to the additive is in a weight range of 50:1 to 5:1.

9 Claims, 4 Drawing Sheets

(56) References Cited

U.S. PATENT DOCUMENTS

| | | | |
|---|---|---|---|
| 4,945,992 | A | 8/1990 | Sacco |
| 5,529,635 | A | 6/1996 | Odell |
| 5,727,628 | A | 3/1998 | Patzner |
| 5,820,766 | A | 10/1998 | Gevertz et al. |
| 6,474,349 | B1 | 11/2002 | Laker |
| 6,926,836 | B2 | 8/2005 | Fidoe et al. |
| 6,973,972 | B2 | 12/2005 | Aronstam |
| 6,986,358 | B2 | 1/2006 | Mattox et al. |
| 7,563,377 | B1 | 7/2009 | Simpson |
| 7,855,171 | B2 | 12/2010 | Trahan |
| 8,673,834 | B2 | 3/2014 | Trahan |
| 2003/0092581 | A1* | 5/2003 | Crews ............... C09K 8/665 507/100 |
| 2005/0263739 | A1* | 12/2005 | Mattox ............... B08B 9/032 252/175 |
| 2006/0029808 | A1 | 2/2006 | Zhai et al. |
| 2007/0108127 | A1 | 5/2007 | Talbot et al. |
| 2008/0236842 | A1 | 10/2008 | Bhaysar et al. |
| 2009/0062156 | A1 | 3/2009 | Wilson et al. |
| 2010/0099596 | A1 | 4/2010 | Trahan |
| 2014/0011013 | A1 | 1/2014 | Jin et al. |
| 2017/0198198 | A1* | 7/2017 | Mahmoud ............. C09K 8/532 |

FOREIGN PATENT DOCUMENTS

| | | |
|---|---|---|
| EP | 662504 | 7/1995 |
| EP | 1663879 | 6/2006 |
| EP | 2836524 | 2/2015 |
| WO | 2013152832 | 10/2013 |

OTHER PUBLICATIONS

Mohamed et al., "Removal of Pyrite and Different Types of Iron Sulfide Scales in Oil and Gas Wells without H2S Generation," XP55492021, International Petroleum Technology Conference, Jan. 1, 2015, 8 pages.

Yap et al., "Removing Iron Sulfide Scale: A Novel Approach," XP55443526, Abu Dhabi International Petroleum Exhibition and Conference, Jan. 1, 2010, 10 pages.

Mccafferty et al., "Field Performance in the Practical Application of Chlorine Dioxide as a Stimulation Enhancement Fluid," XP55492044, SPE Production and Facilities, vol. 8, No. 1, Feb. 1, 1993, 6 pages.

Talbot et al., "TetrakisHydroxymethyl Phosphonium Sulfate (THPS) for Dissolving Iron Sulfides Downhole and Topsides—A study of the Chemistry Influencing Dissolution," XP55443209, Corrosion, Apr. 7, 2002, 14 pages.

International Search Report and Written Opinion issued in International Application No. PCT/US2018/034133 dated Jul. 20, 2018, 18 pages.

EnvTech Inc., "ETI Cleaning & Gas Freeing Solution," EnvTech Inc., Jun. 25, 2011, 5 pages.

Crabtree et al., "Fighting Scale—Removal and Prevention," Oilfield Review, Autumn 1999, 16 pages.

EP Communication Pursuant to Article 94(3) in European Appln. No. 18730602.2, dated Aug. 17, 2021, 7 pages.

Raju et al., "A Feasibility Study of Mixing Disposal Water with Aquifer Water for Downhole Injection," SPE 81449, Society of Petroleum Engineers, 2003, 9 pages.

* cited by examiner

IRON SULFIDE REMOVAL IN OILFIELD APPLICATIONS

CLAIM OF PRIORITY

This application claims priority to U.S. Patent Application No. 62/511,765 filed on May 26, 2017, the entire contents of which are hereby incorporated by reference.

TECHNICAL FIELD

This document relates to methods for mitigating corrosion of carbon steel tubing and surface scaling deposition on carbon steel tubing in oilfield applications, particularly in sour gas wells.

BACKGROUND

Iron sulfide deposition on carbon steel tubing is a persistent problem in the oil and gas industry, especially in sour gas wells. Ferrous ions released from the carbon steel tubing due to corrosion react with hydrogen sulfide in the sour gas, forming iron sulfide deposits in the tubing, affecting well deliverability, interfering with well surveillance, and restricting well intervention. Iron sulfide deposits with low sulfur content (for example, having a weight ratio of iron to sulfur in a range of 0.75 to 1.25) can be removed with concentrated hydrochloric acid. However, the use of concentrated hydrochloric acid corrodes the production string and casing during descaling and leads to generation of hydrogen sulfide, a toxic gas and potential hazard during application. Alternative descalers are less corrosive and safer to use, but yield inferior results to concentrated hydrochloric acid.

SUMMARY

In a first general aspect, a composition for dissolving iron sulfide includes an iron chelant and an additive. The additive includes an oxidizing agent, a base, or both.

In a second general aspect, treating carbon steel tubing in a subterranean formation includes providing a composition including an iron chelant and an additive to the carbon steel tubing, contacting the carbon steel tubing with the composition for a length of time, and dissolving iron sulfide on the carbon steel tubing with the composition to yield chelated iron. The additive includes at least one of an oxidizing agent and a base.

Implementations of the first or second general aspect may include one or more of the following features.

In some implementations, a concentration of the iron chelant in the composition is in a range of 10 wt % to 80 wt %.

The additive may include an oxidizing agent. A concentration of the oxidizing agent in the composition is typically in a range of 0.05 wt % to 15 wt %. The oxidizing agent may include at least one of potassium permanganate, ammonium nitrate, sodium nitrate, sodium bromate, sodium hypochlorite, sodium nitrite, sodium bicarbonate, potassium bicarbonate, ammonium carbonate, ammonium bicarbonate, and iodine.

The additive may include a base. A concentration of the base in the composition is typically in a range of 1 wt % to 60 wt %. The base may include a strong base, a medium base, or a weak base. Examples of strong bases include potassium hydroxide and sodium hydroxide. Examples of medium bases include potassium carbonate, sodium carbonate, potassium bicarbonate, ammonium carbonate, and ammonium bicarbonate.

The iron chelant may include at least one of ethylenediaminetetraacetic acid, diethylenetriaminepentaacetic acid, tetrasodium glutamate diacetate, tetrakis(hydroxymethyl) phosphonium sulfate, nitrilotriacetic acid, citrate, and pyrophosphate.

The composition is free of hydrochloric acid.

A pH of the composition is in a range of 3 to 14.

Implementations of the second general aspect may include one or more of the following features.

Dissolving the iron sulfide does not typically result in the formation of hydrogen sulfide. Dissolving the iron sulfide typically includes dissolving 5 wt % to 100 wt % percent of the iron sulfide. The length of time is typically in a range of 4 hours to 72 hours. After the length of time, corrosion of the carbon steel tubing is less than 0.05 lb/ft$^2$. After the length of time, the composition may be removed from the subterranean formation.

Described embodiments advantageously dissolve iron sulfide surface scale in carbon steel tubing without generating hydrogen sulfide. In addition, corrosion of the carbon steel tubing is reduced compared to that caused by concentrated hydrochloric acid. Moreover, operation costs are reduced in the absence of hydrogen sulfide generation that accompanies treatment with concentrated hydrochloric acid, and capital expenditures are reduced by reducing the corrosion of and thus increasing the durability of the carbon steel.

DETAILED DESCRIPTION

Figure 1:
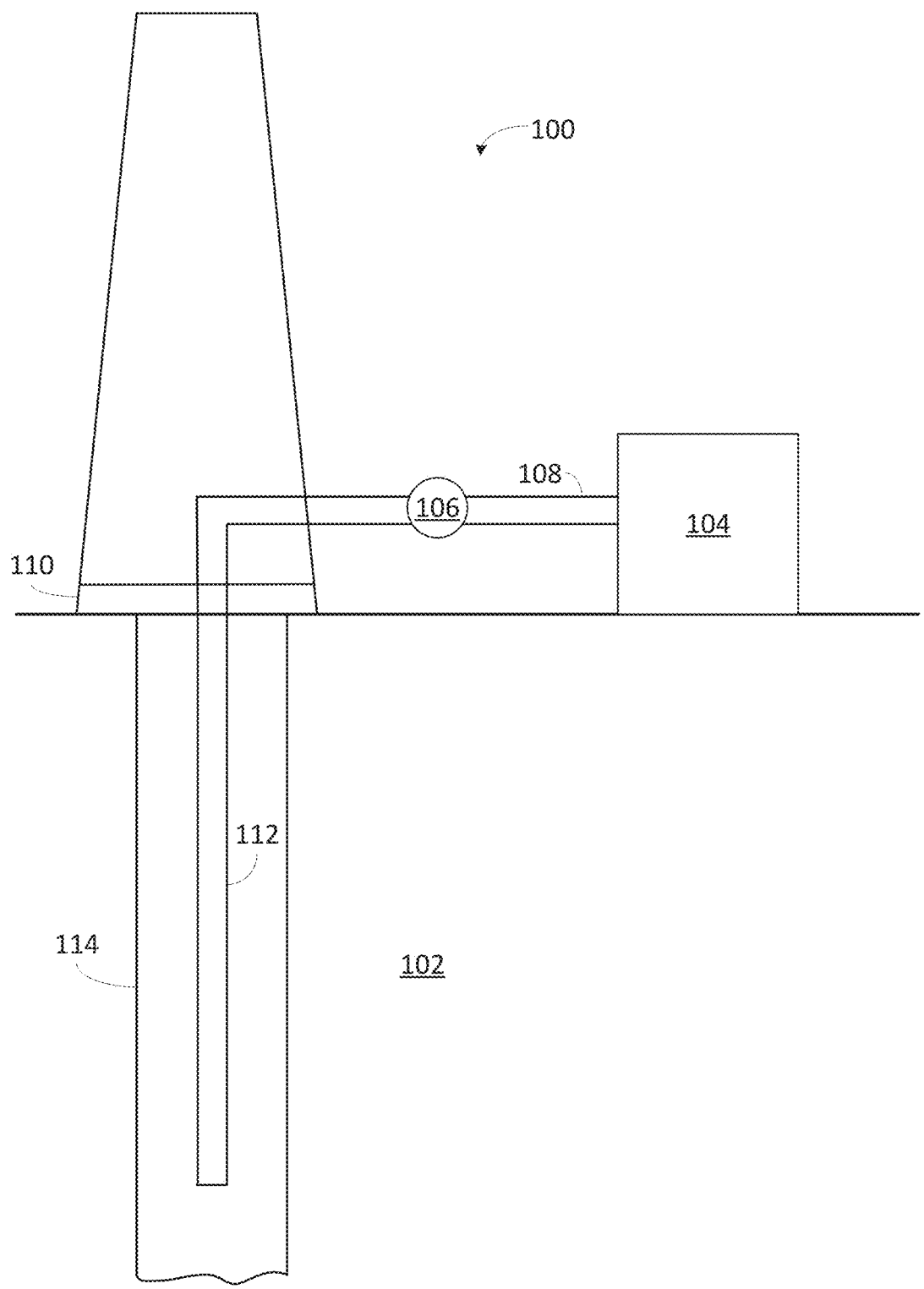
FIG. 1 depicts an exemplary system for dissolving iron sulfide in carbon steel tubing in a subterranean formation.

A composition for dissolving iron sulfide and other iron-containing compounds, such as iron carbonate, includes an iron chelant and an additive that enhances the performance of the iron chelant. The composition may be in the form of a liquid or a solid. The liquid may be an aqueous liquid. The iron sulfide may include iron and sulfur in any appropriate stoichiometric ratio. Examples include $Fe_{(1-x)}S$, where x=0 to 0.2 (pyrrhotite), FeS (troilite and mackinawite), $FeS_2$ (pyrite), $Fe_3S_4$ (greigite), $FeS_2$ (marcasite). One example of pyrrhotite is $Fe_7S_8$. The additive is at least one of an oxidizing agent and a base. The composition may be used to dissolve iron sulfide formed in carbon steel tubing in a subterranean formation, such as carbon steel tubing in an oil or gas well. A weight ratio of the iron chelant to the additive is in a range of 50:1 to 5:1. The iron sulfide dissolution rate may be modified, such as increased or decreased, by adjusting a ratio of the iron chelant to the additive.

The iron chelant dissolves iron sulfide scale, such as minerals including iron sulfide formed on a surface of carbon steel tubing, by chelating the iron in the iron sulfide.

The iron chelant may also chelate more soluble forms of iron present in solution, such as iron oxides, iron carbonate, and the like. In some embodiments, the iron chelant includes at least one of ethylenediaminetetraacetic acid (EDTA), diethylenetriaminepentaacetic acid (DTPA), tetrasodium glutamate diacetate (GLDA), nitrilotriacetic acid (NTA), citrate, pyrophosphate ($P_2O_7$), and tetrakis(hydroxymethyl)phosphonium sulfate (THPS). A concentration of the iron chelant in the composition is typically in a range of 1 weight % (wt %) to 80 wt %.

When present in the composition, an oxidizing agent oxidizes iron sulfide, which reacts in water to yield more water-soluble compounds, such as iron oxides. The oxidizing agent also oxidizes reaction products formed during the dissolution of iron sulfide, removing or converting the reaction products, and thereby shifting the reaction equilibrium and increasing the dissolution rate of the iron sulfide. Increasing the dissolution rate decreases the length of time the composition must be in contact with the iron sulfide to achieve a desired level of dissolution or scale removal.

Suitable oxidizing agents include potassium permanganate, ammonium nitrate, sodium nitrate, sodium bromate, sodium hypochlorite, sodium nitrite, sodium chlorite, ammonium persulfate, sodium thiosulfate, and iodine. In some embodiments, an oxidizing agent is an acid. The acid may be a strong acid or a weak acid. A suitable example of a strong acid is nitric acid. A concentration of the oxidizing agent in the composition is typically in a range of 0.05 wt % to 15 wt %.

The base may be a strong base, a medium base, a weak base, or a combination thereof. Suitable strong bases include sodium hydroxide and potassium hydroxide. Suitable medium bases include potassium carbonate, sodium carbonate, sodium bicarbonate, potassium bicarbonate, ammonium carbonate, and ammonium bicarbonate. Suitable weak bases include EDTA having a pH of about 7-8. A concentration of the base in the composition is typically in a range of 1 wt % to 60 wt %.

The composition typically has a pH in a range of 3 to 14.

When provided to carbon steel tubing in subterranean formations, these compositions for iron sulfide dissolution remove iron sulfide deposits and other iron-containing deposits, thereby restoring well accessibility and increasing productivity. These compositions may provide an iron sulfide dissolution capacity comparable to that of hydrochloric acid without causing damage to well integrity or posing safety concerns, such as concerns related to the generation of toxic hydrogen sulfide gas. By way of comparison, 1 mole of hydrochloric acid (concentration 15-28% by weight) dissolves about 35 g of iron sulfide, and 1 mole of a composition described herein dissolves about 25 g of iron sulfide. In situ treatment of carbon steel tubing with these compositions results in metal loss of less than 0.05 lb/ft² over the treatment. In one example, in situ treatment includes pumping the composition in a downhole tubing and soaking for 4-24 hours under well conditions. By way of comparison, metal loss with hydrochloric acid is about 0.45 lb/ft² at 125° C. over 4 hours. Thus, corrosion of carbon steel tubing treated with these compositions is reduced compared to corrosion of carbon steel tubing treated with concentrated hydrochloric acid for iron sulfide dissolution.

FIG. 1 depicts exemplary system 100 for providing a composition for dissolving iron sulfide to a well in subterranean formation 102. A composition including an iron chelant and an additive is pumped from source 104 via pump 106 through line 108 to wellhead 110, and enters carbon steel tubing 112. Iron sulfide is present on a surface of carbon steel tubing 112. As indicated by the arrows, the composition may circulate back up wellbore 114 through the annular path between the wellbore and carbon steel tubing 112. This composition may be reintroduced into carbon steel tubing 112 to maintain contact with the carbon steel tubing for a length of time referred to as the "treatment time" or "soaking time." The treatment time may be selected to dissolved a target percentage of scale formed on the carbon steel tubing. In some embodiments, treatment time of 4-72 hours results in iron sulfide dissolution of 25-100%.

Figure 2:
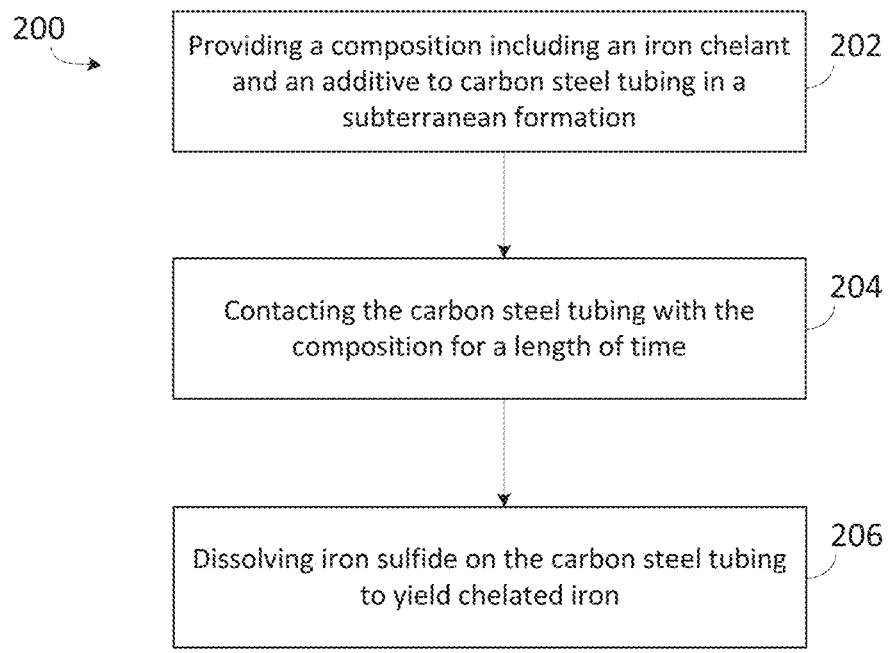
FIG. 2 is a flowchart showing operations in a first exemplary process for dissolving iron sulfide in carbon steel tubing in a subterranean formation.

FIG. 2 is a flowchart showing operations in process 200 for dissolving iron sulfide in carbon steel tubing in a subterranean formation. In 202, the composition described in this disclosure including an iron chelant and an additive is provided to the carbon steel tubing. A weight ratio of the iron chelant to the additive is in a range of 50:1 to 5:1. In 204, the carbon steel tubing is contacted with the composition for a length of time. The length of time is in a range of 4-72 hours. In 206, iron sulfide on the carbon steel tubing is dissolved to yield chelated iron. Over the length of time, 5-100% of the iron sulfide is dissolved. Dissolving the iron sulfide does not result in formation of hydrogen sulfide. After the length of time, corrosion of the carbon steel tubing is than 0.05 lb/ft². In some embodiments, after the length of time, the composition is removed from the subterranean formation.

EXAMPLES

Dissolution Tests—Iron Chelant with a Base

The ability of various compositions to dissolve iron sulfide was assessed by placing samples of iron sulfide minerals in a high-temperature cell containing a control composition or a composition including an iron chelant and a base. In the following examples, control compositions and compositions including an iron chelant and a base are referred to as "dissolvers." The contents of the high-temperature cell were heated to a specified temperature for a specified length of time. After the specified length of time had elapsed, the contents of the high-temperature cell were filtered, and the remaining solids were rinsed with deionized water and dried at 80° C. overnight. The dried solids were weighed, and percent dissolution of the sample was calculated by subtracting the mass of the remaining solid from the initial mass of the sample and dividing by the mass of the initial sample.

20 mL of a dissolver and 2 g of pyrrhotite, an iron sulfide mineral with the formula $Fe_{(1-x)}S$, where x=0 to 0.2, were placed in a high-temperature cell and held at 125° C. for 24 hours at 14.7 psi. The remaining solids were dried, and percent dissolution was calculated. The composition (iron sulfide component) and pH of the dissolvers are listed in Table 1.

TABLE 1

| Dissolvers | | |
|---|---|---|
| Dissolver | pH | Description |
| HCl (15 wt %) | < 0 | Strong acid |
| Low pH chelant | 6-8 | pH neutralized (15% HCl) EDTA (10-20 wt %) |
| THPS | 2-5 | THPS (30 wt %) |
| High pH chelant | >12 | EDTA (10-25 wt %) with KOH |

Figure 3:
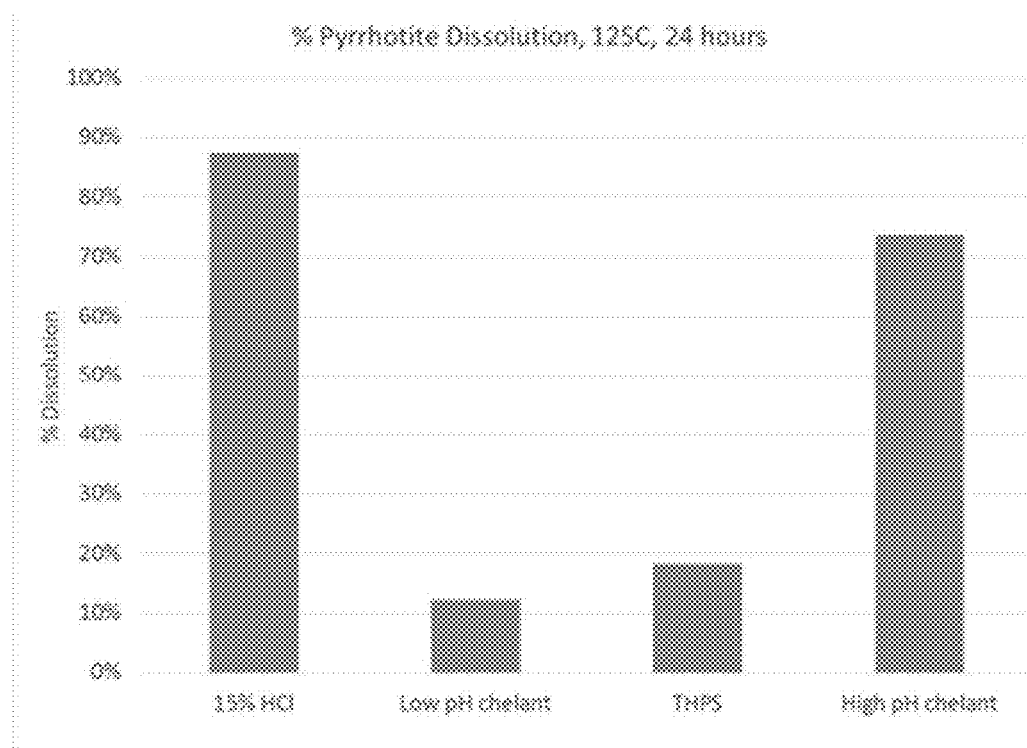
FIG. 3 shows dissolution of iron sulfide for hydrochloric acid and various dissolver compositions.

FIG. 3 shows percent dissolution of the pyrrhotite in the dissolvers of Table 1 after 24 hours at 125° C. and 14.7 psi. The 15% HCl dissolved the scale sample rapidly at the initial stage of the test. It dissolved about 88% of the scale after 24 hours. The dissolution performance of high pH chelant exceeded that of the low pH chelant and THPS after 24 hours, with about 73% dissolution, compared to about 12% dissolution for low pH chelant and 19% dissolution for THPS.

Figure 4:
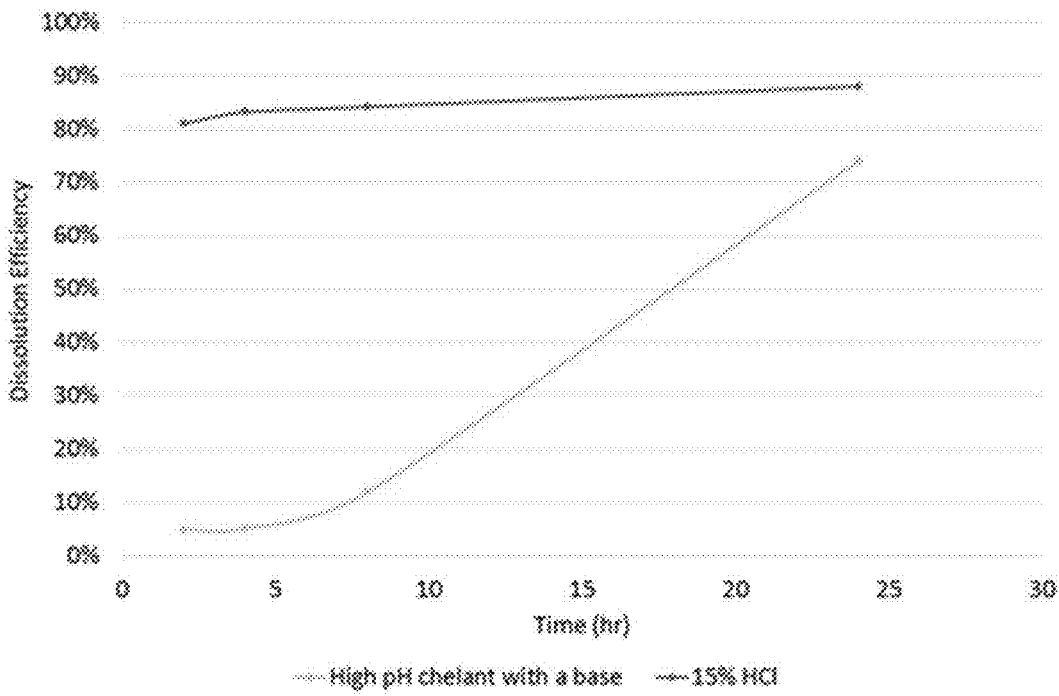
FIG. 4 shows dissolution of iron sulfide over time by hydrochloric acid and a high pH chelant with a base.

FIG. 4 shows percent dissolution as a function of time from 2 hours to 24 hours at 125° C. and 14.7 psi for 15% HCl (top) and the high pH chelant of Table 1 (bottom). The 15% HCl dissolved the field scale sample rapidly at the initial stage of the test: about 80% of the scale was dissolved in the first two hours. The dissolution rate of high pH chelant is slower over the first 8 hours, and increases over time.

Corrosion Tests—Iron Chelant with a Base

Mild steel C1010 coupons were rinsed with distilled water and acetone and then dried in air. Corrosion of the steel coupons immersed in the dissolvers of Table 1 for 4 hours at 125° C. and 14.7 psi was assessed by the difference in coupon weight before and after immersion. Table 2 lists corrosion in $lb/ft^2$ for the dissolvers of Table 1. As seen in Table 2, except for hydrochloric acid, each of the dissolvers demonstrated corrosion of less than 0.05 $lb/ft^2$ in 4 hours at 125° C., with the high pH chelant having the lowest value (0.001 $lb/ft^2$). The hydrochloric acid showed very high corrosion, with a corrosion of 0.45 $lb/ft^2$.

TABLE 2

Corrosion of mild steel C1010 coupons with various dissolvers

| Dissolver | Corrosion ($lb/ft^2$) |
| --- | --- |
| THPS | 0.041 |
| Low pH chelant | 0.015 |
| 15% HCL | 0.45 |
| High pH chelant | 0.001 |

Dissolution Tests—Iron Chelant with Base and Oxidizing Agent

In order to improve the dissolution rate, especially at the initial stage of dissolution (less than 8 hours), oxidizers were combined with the high pH chelant dissolver of Table 1. The ability of various compositions to dissolve iron sulfide was assessed by placing samples of iron sulfide minerals in a high-temperature cell containing a control composition or a composition including a high pH chelant and an oxidizing agent. In the following examples, control compositions and compositions including an iron chelant with an oxidizing agent and a base are referred to as "dissolvers." The contents of the high-temperature cell were heated to a specified temperature for a specified length of time. After the specified length of time had elapsed, the contents of the high-temperature cell were filtered, and the remaining solids were rinsed with de-ionized water and dried at 80° C. overnight. The dried solids were weighed, and percent dissolution of the sample was calculated by subtracting the mass of the remaining solid from the initial mass of the sample and dividing by the mass of the initial sample.

20 mL of a dissolver (the high pH chelant of Table 1, with and without an oxidizer) and 2 g of pyrrhotite, an iron sulfide mineral with the formula $Fe_{(1-x)}S$, where x=0 to 0.2, were placed in a high-temperature cell and held at 125° C. for 4 hours at 14.7 psi. Dissolvers 1A, 2A, 3A, and 4A each included 0.0 g of the listed oxidizer. Dissolvers 1B, 2B, 3B, and 4B each included 0.2 g of the listed oxidizer. Dissolvers 1C, 2C, 3C, and 4C each included 0.6 g of the listed oxidizer. Dissolvers 1D, 2D, 3D, and 4D each included 0.8 g of the listed oxidizer. After four hours, the remaining solids were dried, and percent dissolution was calculated. The composition and pH of the dissolvers are listed in Table 3.

TABLE 3

Dissolvers

| Dissolver | Chelant composition | Oxidizer | pH | Description |
| --- | --- | --- | --- | --- |
| 1A-1C | High pH chelant | $NaNO_2$ | >12 | 0 g, 0.2 g, 0.6 g, |
| 2A-2C | High pH chelant | $KMnO_4$ | >12 | 0.8 g oxidizer in 20 |
| 3A-3C | High pH chelant | $NaClO_2$ | >12 | mL high pH chelant |
| 4A-4C | High pH chelant | $NaBrO_3$ | >12 | of Table 1 |

Figure 5:
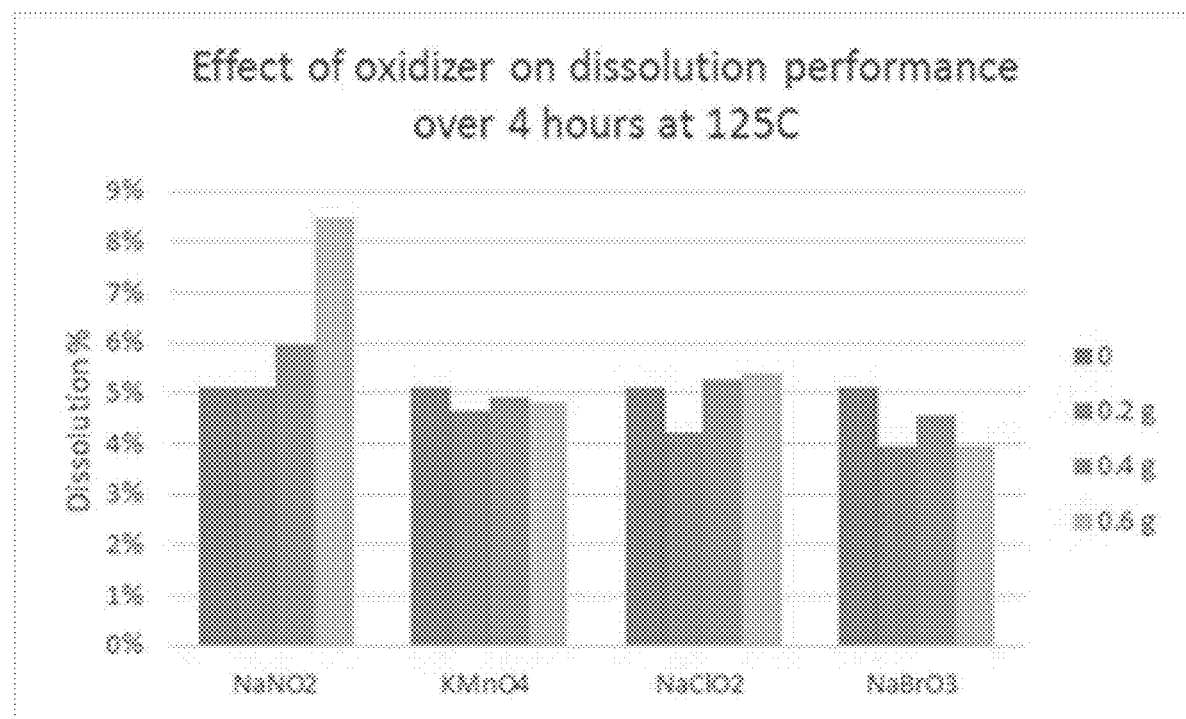
FIG. 5 shows dissolution of iron sulfide for a high pH chelant and a base with various oxidizing agents.

FIG. 5 shows percent dissolution after 4 hours at 125° C. and 14.7 psi for the high pH chelant, and $NaNO_2$, $KMnO_4$, $NaClO_2$, and $NaBrO_3$ oxidizers. The high pH chelant with a base dissolved about 5% of the pyrrhotite sample over 4 hours at 125° C. and 14.7 psi. The oxidizers, $KMnO_4$, $NaClO_2$, and $NaBrO_3$ did not appear to increase dissolution of the dissolver. However, the presence of $NaNO_2$ improved dissolution performance, with 0.6 g of $NaNO_2$ showing an increase from about 5% to about 8.2%, or an improvement exceeding 60% in the 4 hour test.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" can allow for a degree of variability in a value or range, for example, within 10%, within 5%, or within 1% of a stated value or of a stated limit of a range.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any below-ground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

"Sour gas well" refers to a well that produces natural gas or any other gas containing a significant amount of hydrogen sulfide. In one example, natural gas is considered to be sour if the gas contains greater than 5.7 mg of hydrogen sulfide per cubic meter of natural gas, or greater than 4 ppm by volume under standard temperature and pressure. In other examples, natural gas is considered to be sour if the gas contains greater than 24 ppm by volume or 100 ppm by volume of hydrogen sulfide.

OTHER EMBODIMENTS

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating carbon steel tubing in a subterranean formation, the method comprising:
providing a composition comprising an iron chelant, a base, and an oxidizing agent, wherein the oxidizing agent comprises 3 to 15 wt % of sodium nitrite;
contacting the carbon steel tubing with the composition for a length of time; and dissolving iron sulfide on the carbon steel tubing with the composition to yield chelated iron.

2. The method of claim 1, wherein dissolving the iron sulfide does not result in formation of hydrogen sulfide.

3. The method of claim 1, wherein dissolving the iron sulfide comprises dissolving 5 wt % to 100 wt % percent of the iron sulfide.

4. The method of claim 1, wherein the length of time is in a range of 4 hours to 72 hours.

5. The method of claim 1, wherein, after the length of time, corrosion of the carbon steel tubing is less than 0.05 $lb/ft^2$.

6. The method of claim 1, comprising, after the length of time, removing the composition from the subterranean formation.

7. The method of claim 1, wherein the concentration of the iron chelant in the composition as provided is in a range of 10 wt % to 80 wt %.

8. The method of claim 1, wherein the composition is free of hydrochloric acid.

9. The method of claim 1, wherein the pH of the composition as provided is in a range of 3 to 14.

* * * * *